US011544348B2

(12) United States Patent
Gudla et al.

(10) Patent No.: US 11,544,348 B2
(45) Date of Patent: *Jan. 3, 2023

(54) NEURAL NETWORK BASED POSITION ESTIMATION OF TARGET OBJECT OF INTEREST IN VIDEO FRAMES

(71) Applicant: Tata Consultancy Services Limited, Mumbai (IN)

(72) Inventors: Balakrishna Gudla, Hyderabad (IN); Krishna Rao Kakkirala, Hyderabad (IN); Srinivasa Rao Chalamala, Hyderabad (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 975 days.

This patent is subject to a terminal disclaimer.

(21) Appl. No.: 16/292,155

(22) Filed: Mar. 4, 2019

(65) Prior Publication Data
US 2020/0026987 A1    Jan. 23, 2020

(30) Foreign Application Priority Data
Mar. 5, 2018   (IN) .............................. 201821007979

(51) Int. Cl.
*G06F 17/16* (2006.01)
*G06F 17/18* (2006.01)
(Continued)

(52) U.S. Cl.
CPC .............. *G06F 17/16* (2013.01); *G06F 17/18* (2013.01); *G06T 7/77* (2017.01); *G06V 10/82* (2022.01);
(Continued)

(58) Field of Classification Search
CPC . G06T 2207/20081; G06T 2207/20084; G06T 2207/10016; G06T 7/73;
(Continued)

(56) References Cited

U.S. PATENT DOCUMENTS 10,902,615 B2 *  1/2021  Tao et al. ............... G06V 10/82
11,157,771 B2 * 10/2021  Gundogdu et al. ..... G06T 7/248
2017/0124409 A1   5/2017  Choi et al.

FOREIGN PATENT DOCUMENTS

CN    106951867          7/2017
CN    107424177 A  * 12/2017  ............. G06T 7/246
(Continued)

OTHER PUBLICATIONS

Selvaraju et al. "Grad-CAM: Why did you say that?." arXiv preprint arXiv:1611.07450 (Year: 2016).*

*Primary Examiner* — Gandhi Thirugnanam
*Assistant Examiner* — Michael Adam Shariff
(74) *Attorney, Agent, or Firm* — Finnegan, Henderson, Farabow, Garrett & Dunner LLP

(57) ABSTRACT

Visual target tracking is task of locating a target in consecutive frame of a video. Conventional systems observe target behavior frames of the video. However, dealing with this problem is very challenging when video has illumination variations, occlusion, change in size and view of the object due to relative motion between camera and object. Embodiments of the present disclosure addresses this problem by implementing Neural Network (NN), its features and their corresponding gradients. Present disclosure explicitly guides the NN by feeding target object of interest (ToI) defined by a bounding box in the first frame of the video. With this guidance, NN generates target activation map via convolutional features map and their gradient maps, thus giving tentative location of the ToI to further exploit to locate target object precisely by using correlation filter(s) and peak location estimator, thus repeating process for every frame of video to track ToI accurately.

15 Claims, 8 Drawing Sheets

(51) Int. Cl.
*G06T 7/77* (2017.01)
*G06V 10/82* (2022.01)

(52) U.S. Cl.
CPC ............... *G06T 2207/10016* (2013.01); *G06T 2207/20081* (2013.01); *G06V 2201/07* (2022.01)

(58) Field of Classification Search
CPC . G06T 7/77; G06T 2207/20104; G06T 7/001; G06T 7/74; G06T 7/0014; G06T 7/248; G06T 7/337; G06V 10/82; G06V 10/454; G06V 30/18057; G06V 10/70; G06V 10/10; G06V 10/20; G06V 30/194; G06V 10/764; G06V 20/70; G06V 20/00; G06V 10/54; G06V 30/18; G06V 20/46; G06V 10/476; G06V 30/1834; G06V 10/72; G06V 10/473; G06V 10/7715; G06V 2201/07; G06V 10/22; G06V 30/1444; G06V 10/225; G06V 10/25; G06V 30/147; G06N 3/02; G06N 3/08; G06N 3/0454; G06K 9/00; G06K 9/62; G06K 9/6217; G06K 9/6267; G06K 9/6268; G06K 9/6269; G06K 9/627; G06K 9/6271; G06K 9/6272; G06K 9/6273; G06K 9/6274; G06K 9/6276; G06K 9/6277; G06K 9/6278; G06K 9/6279; G06K 9/628; G06K 9/6281; G06K 9/6282; G06K 9/6284; G06K 9/6285; G06K 9/6286; G06K 9/6287; G06K 9/6232; G06K 9/6298; G06F 17/16; G06F 17/18

See application file for complete search history.

(56) References Cited

FOREIGN PATENT DOCUMENTS

CN 107491742 A * 12/2017 ........... G06T 3/4007
WO WO-2014/205231 12/2014

* cited by examiner

NEURAL NETWORK BASED POSITION ESTIMATION OF TARGET OBJECT OF INTEREST IN VIDEO FRAMES

PRIORITY CLAIM

This U.S. patent application claims priority under 35 U.S.C. § 119 to: India Application No. 201821007979, filed on Mar. 5, 2018. The entire contents of the aforementioned application are incorporated herein by reference.

TECHNICAL FIELD

The disclosure herein generally relates to localization of objects, and, more particularly, to Neural Network (NN) based position estimation of target object of interest in video frames.

BACKGROUND

Visual target tracking is a task of locating a target (i.e., object of interest) in each consecutive frame of a video. Applications include surveillance, customer behaviour monitoring retail, navigation, and the like. A video consists of several frames. In general, a target is defined by a notation such as a marker indicative of boundary identifying the target in the first frame of the video, and it is tracked in successive frames of the video. Visual target tracking empowers conventional systems to automatically observe the target behavior in every frame of the video. However, dealing with this problem is very challenging when the video has illumination variations, occlusion, change in size and view of the object due to relative motion between camera and object.

SUMMARY

Embodiments of the present disclosure present technological improvements as solutions to one or more of the above-mentioned technical problems recognized by the inventors in conventional systems. In one aspect, there is provided a processor implemented method comprising: receiving, at a neural network, a first input comprising a video frame, and a second input comprising a target object of interest in the video frame, wherein a corresponding class label is generated based on the second input; receiving, at a first part of the neural network, a current frame to generate one or more corresponding convolutional feature maps; generating, by a softmax layer of the neural network, a probability score for the generated one or more corresponding convolutional feature maps, wherein the probability score is generated by the softmax layer by utilizing a second part of the neural network; generating by a cost function, a cost value based on the corresponding generated class label and the corresponding probability score; generating one or more gradient maps using the cost value and the generated one or more corresponding convolutional feature maps; generating one or more target activation maps based on the generated one or more gradient maps and the generated one or more corresponding convolutional feature maps; and identifying a tentative location of the target object of interest in the video frame based on the one or more target activation maps.

In an embodiment, the step of identifying a tentative location of the target object of interest in the video frame based on the one or more target activation maps comprises: resampling, the generated one or more corresponding convolution feature maps into a size of the video frame; converting the generated one or more gradient maps to a single dimensional vector; generating one or more target activation maps based on the size of the video frame and the single dimensional vector; and identifying the tentative location of the target object of interest in the video frame using the generated one or more target activation maps.

In an embodiment, the method may further comprise identifying, by a peak location estimator, a position of the target object in the video frame based on the tentative location. In an embodiment, the step of identifying, by a peak estimator, a position of the target object comprises: extracting one or more patches from one or more neighborhoods of the tentative location of the generated one or more target activation maps; generating, by using a correlation filter, a correlation filter response for each frame at center of the target object of interest; identifying a peak value based on the correlation filter response generated for each frame; and estimating the position of the target object based on the identified peak value in the correlation filter response for each frame.

In an embodiment, the method may further comprise training the correlation filter based on the identified peak value and at least one of a corresponding patch or one or more features extracted from the corresponding patch; and updating one or more parameters pertaining to the correlation filter.

In another aspect, there is provided a system comprising: a memory storing instructions; one or more communication interfaces; and one or more hardware processors coupled to the memory via the one or more communication interfaces, wherein the one or more hardware processors are configured by the instructions to: receive, by a neural network, a first input comprising a video frame, and a second input comprising a target object of interest in the video frame, wherein a corresponding class label is generated based on the second input; receive, at a first part of the neural network, a current frame to generate one or more corresponding convolutional feature maps; generate, by using a softmax layer of the neural network, a probability score for the generated one or more corresponding convolutional feature maps, wherein the probability score is generated by the softmax layer by utilizing a second part of the neural network; generate by a cost function of the neural network, a cost value based on the corresponding generated class label and the corresponding probability score; generate one or more gradient maps using the cost value and the generated one or more corresponding convolutional feature maps; generate, by using a target activation map generator, one or more target activation maps based on the generated one or more gradient maps and the generated one or more corresponding convolutional feature maps; and identify a tentative location of the target object of interest in the video frame based on the one or more target activation maps. In an embodiment, the tentative location of the target object of interest in the video frame is identified based on the one or more target activation maps by: sampling, by using a sampler, the generated one or more corresponding convolution feature maps into a size of the video frame and converting the generated one or more gradient maps to a single dimensional vector; generating, by the target activation map generator, one or more target activation maps based on the size of the video frame and the single dimensional vector; and identifying the tentative location of the target object of interest in the video frame using the generated one or more target activation maps.

In an embodiment, the hardware processors are further configured to identify, by using a peak location estimator, a position of the target object in the video frame based on the tentative location. In an embodiment, the peak location estimator, estimates the position of the target object by extracting, by using a pre-process and patch of interest extractor, one or more patches from one or more neighborhoods of the tentative location of the generated one or more target activation maps; generating, by using a correlation filter, a correlation filter response for each frame at center of the target object of interest; identifying, by using a peak estimator, a peak value based on the correlation filter response generated for each frame; and estimating the position of the target object based on the identified peak value in the correlation filter response for each frame.

In an embodiment, the correlation filter is based on the identified peak value and at least one of a corresponding patch or one or more features extracted from the corresponding patch; and update one or more parameters pertaining to the correlation filter.

In yet another aspect, there is provided one or more non-transitory machine readable information storage mediums comprising one or more instructions which when executed by one or more hardware processors causes receiving, at a neural network, a first input comprising a video frame, and a second input comprising a target object of interest in the video frame, wherein a corresponding class label is generated based on the second input; receiving, at a first part of the neural network, a current frame to generate one or more corresponding convolutional feature maps; generating, by a softmax layer of the neural network, a probability score for the generated one or more corresponding convolutional feature maps, wherein the probability score is generated by the softmax layer by utilizing a second part of the neural network; generating by a cost function, a cost value based on the corresponding generated class label and the corresponding probability score; generating one or more gradient maps using the cost value and the generated one or more corresponding convolutional feature maps; generating one or more target activation maps based on the generated one or more gradient maps and the generated one or more corresponding convolutional feature maps; and identifying a tentative location of the target object of interest in the video frame based on the one or more target activation maps.

In an embodiment, the step of identifying a tentative location of the target object of interest in the video frame based on the one or more target activation maps comprises: resampling, the generated one or more corresponding convolution feature maps into a size of the video frame; converting the generated one or more gradient maps to a single dimensional vector; generating one or more target activation maps based on the size of the video frame and the single dimensional vector; and identifying the tentative location of the target object of interest in the video frame using the generated one or more target activation maps.

In an embodiment, the one or more instructions which when executed by the one or more hardware processors further causes identifying, by a peak location estimator, a position of the target object in the video frame based on the tentative location. In an embodiment, the step of identifying, by a peak estimator, a position of the target object comprises: extracting one or more patches from one or more neighborhoods of the tentative location of the generated one or more target activation maps; generating, by using a correlation filter, a correlation filter response for each frame at center of the target object of interest; identifying a peak value based on the correlation filter response generated for each frame; and estimating the position of the target object based on the identified peak value in the correlation filter response for each frame.

In an embodiment, the one or more instructions which when executed by one or more hardware processors may further cause training the correlation filter based on the identified peak value and at least one of a corresponding patch or one or more features extracted from the corresponding patch; and updating one or more parameters pertaining to the correlation filter.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
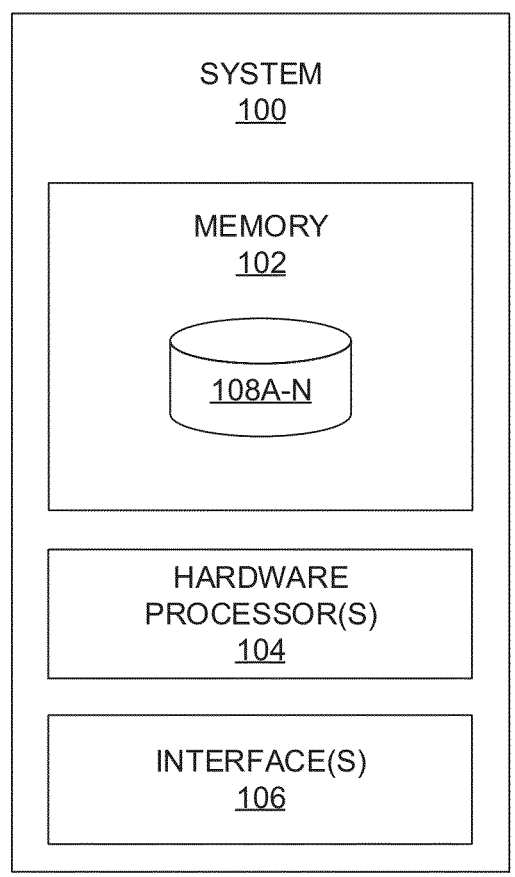
FIG. 1 illustrates an exemplary block diagram of a system for position estimation of target object of interest in video frames, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Few existing methods use only the patch of interest to find the updated location of the target in the next frame but embodiments of the present disclosure use this patch as an explicit guiding mechanism to find a location from full frame irrespective of amount of change in its position. This helps in efficiently locating the target object of interest when the target object is moving at a higher speed (see FIG. 6B, for example).

As mentioned above, visual target tracking is a task of locating a target (i.e., object of interest) in each consecutive frame of a video. Conventional systems automatically observe the target behavior in every frame of the video. However, dealing with this problem is very challenging when the video has illumination variations, occlusion, change in size and view of the object due to relative motion between camera, object, speed/acceleration of the moving target, etc. The embodiments of the present disclosure has made an attempt to address the above problem by implementing neural network(s), for example, a Convolutional Neural Network (also referred as ConvNet hereinafter), and its features and their corresponding gradients. Initially, ConvNet is trained on extensive image database which has multiple object classes. Deep layers of ConvNet produces high-level features for a given image, and their gradient maps concerning desired class produce target activation map. One limitation of the ConvNet is that it is unaware of which is the target object in the full frame of a video. Hence to make ConvNet aware of the target in full frame, the embodiments of the present disclosure explicitly guided the ConvNet by feeding target of interest (i.e., target object) defined by a bounding box in the first frame of the video. With this target guidance ConvNet can now generate target activation map by using convolutional features and their gradient maps. Target activation map can give the tentative location of the target, and this is further exploited to locate target precisely by using correlation filters and peak location estimator, thus repeating the process for every frame of the video to track the target object accurately.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates an exemplary block diagram of a system 100 for position estimation of target object of interest in video frames, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, Graphics processing units (GPUs), hardware accelerators, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method (of FIG. 5) by the one or more processors 104.

Figure 2:
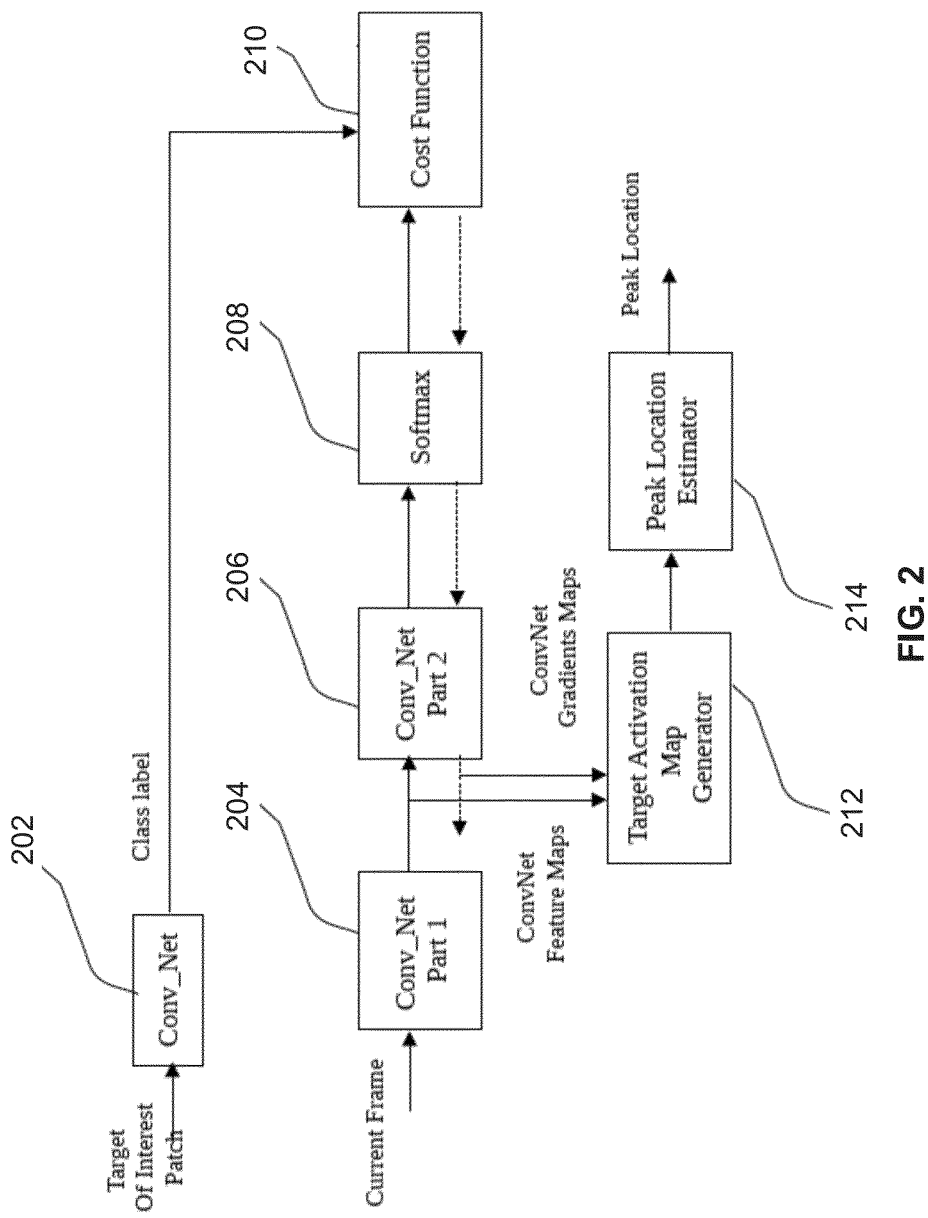
FIG. 2 is a high level block diagram of a neural network illustrating key stages in a processor implemented method for position estimation of target object of interest in video frames in accordance with an embodiment of the present disclosure.
Figure 3:
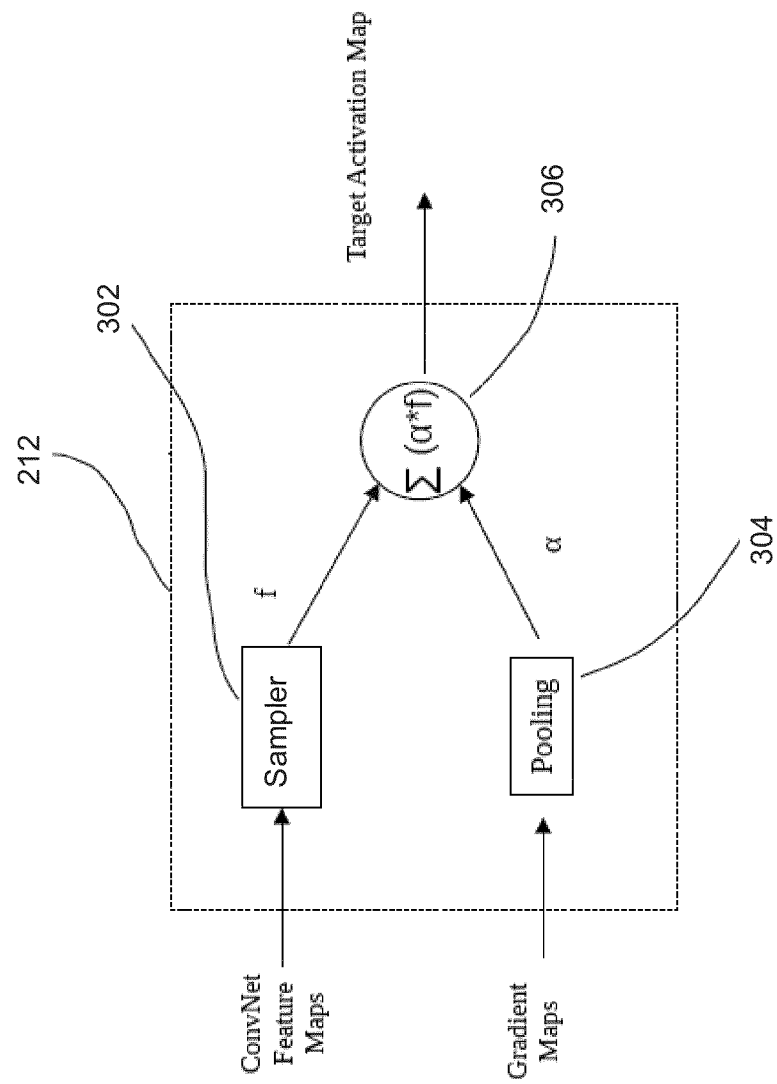
FIG. 3 is an exemplary block diagram of a target activation map generator illustrating key stages in a processor implemented method for generating one or more target activation maps for facilitating identification of tentative location of target object of interest in video frames, in accordance with an embodiment of the present disclosure.
Figure 4:
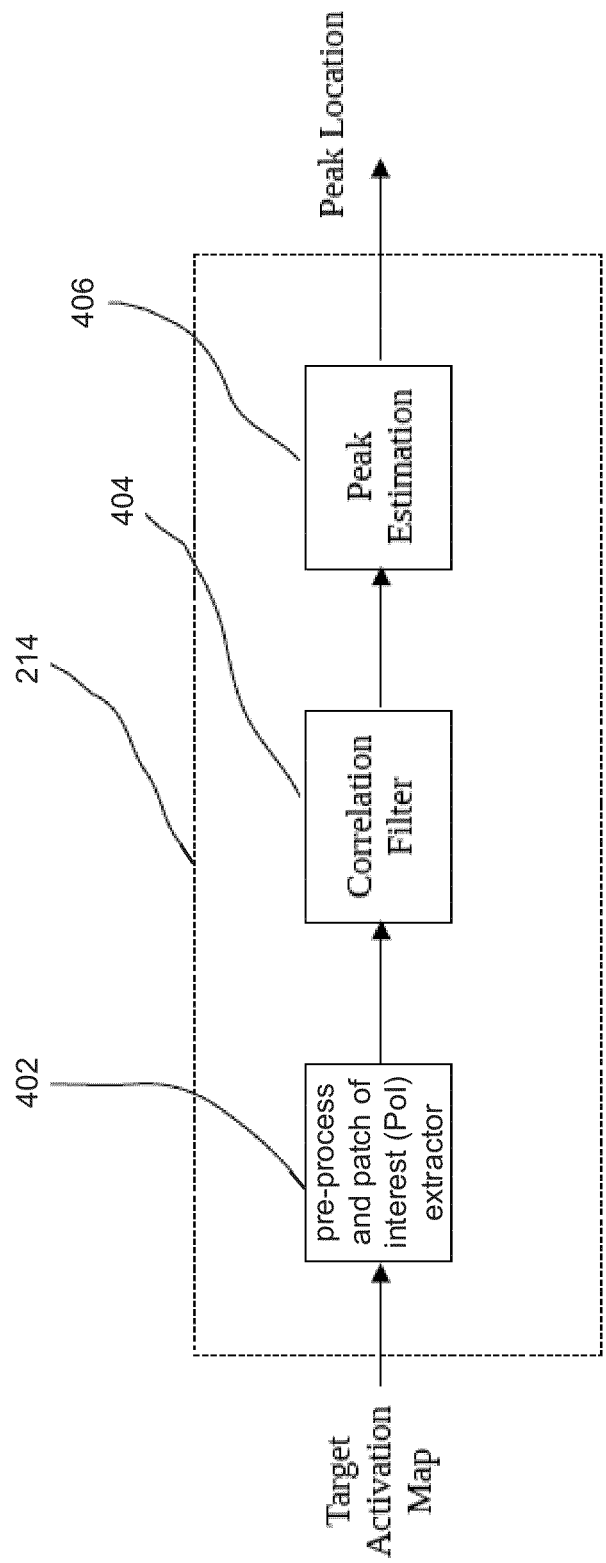
FIG. 4 is an exemplary block diagram of a peak location estimator illustrating key stages in a processor implemented method for estimating a position of the target object of interest in accordance with an embodiment of the present disclosure.
Figure 5:
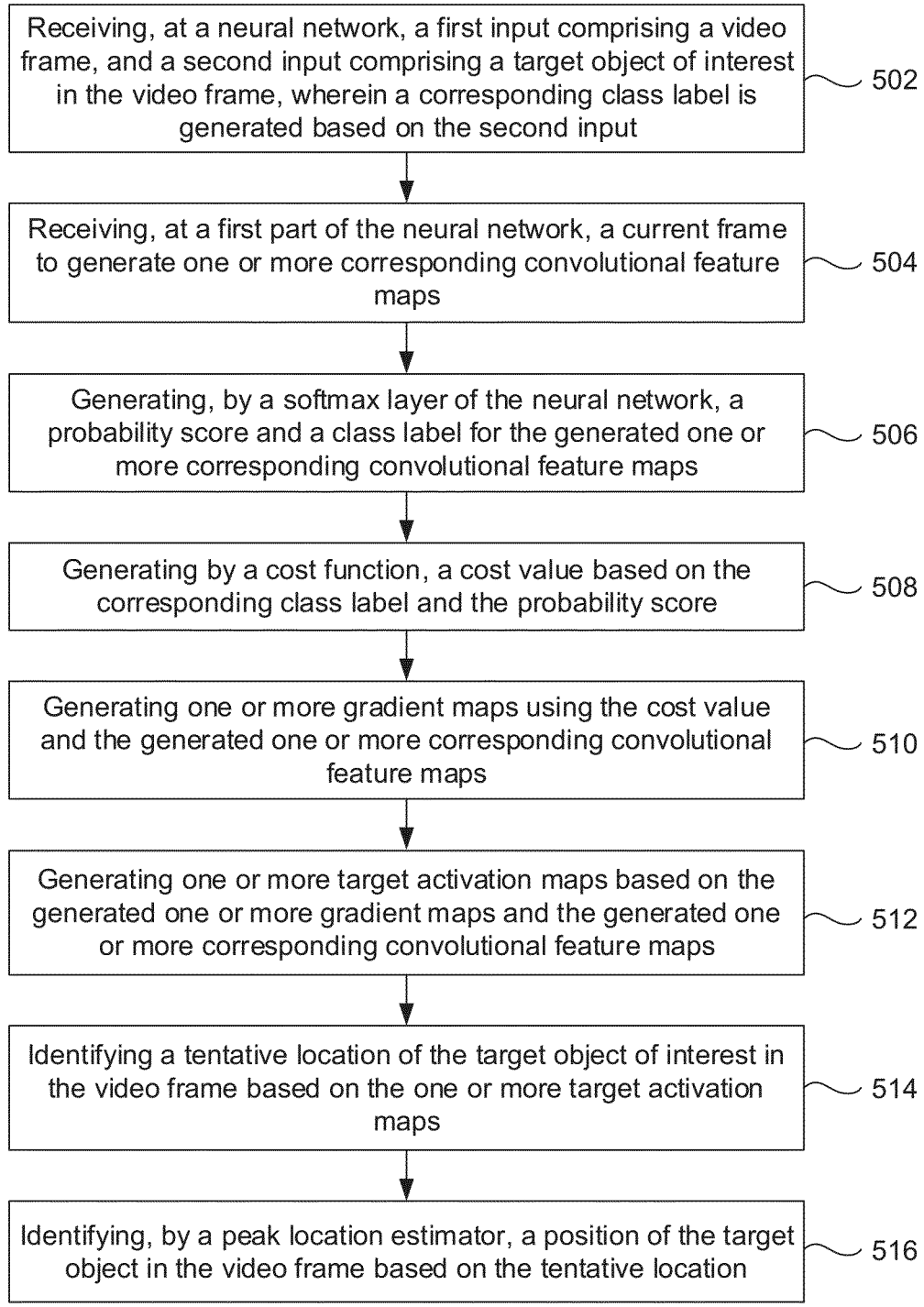
FIG. 5 is an exemplary flow diagram illustrating a processor implemented method for neural network based position estimation of target object of interest in video frames in accordance with an embodiment of the present disclosure.

FIG. 2, with reference to FIG. 1, is a high level block diagram of a neural network illustrating key stages in a processor implemented method for position estimation of target object of interest in video frames in accordance with an embodiment of the present disclosure. FIG. 3, with reference to FIGS. 1-2, is an exemplary block diagram of a target activation map generator illustrating key stages in a processor implemented method for generating one or more target activation maps for facilitating identification of tentative location of target object of interest in video frames, in accordance with an embodiment of the present disclosure. FIG. 4, with reference to FIGS. 1 through 3, is an exemplary block diagram of a peak location estimator illustrating key stages in a computer/processor implemented method for estimating a position of the target object of interest in accordance with an embodiment of the present disclosure. FIG. 5, with reference to FIGS. 1 through 4, is an exemplary flow diagram illustrating a computer/processor implemented method for neural network based position estimation of target object of interest in video frames in accordance with an embodiment of the present disclosure. The steps of the method will now be explained in detail with reference to the components of the system 100 of FIG. 1 and the key stages depicted in FIGS. 2 through 4. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment of the present disclosure, at step 502, the one or more processors 104 are configured to receive, at a neural network (e.g., a Convolution Neural Network (CNN) as depicted in FIG. 2), a first input comprising a video frame, and a second input comprising a target object of interest in the video frame. In an embodiment of the present disclosure, a corresponding class label is generated based on the second input (e.g., target object of interest or patch comprising the target object of interest) received at the CNN block 202. In an embodiment of the present disclosure, initially, the neural network (e.g., the CNN) is trained on large image database having multiple classes. After the training process, the CNN is fed with two types of inputs simultaneously, one is the target object of interest in the video frame, and another one is full frame of the video.

In an embodiment of the present disclosure, at step 504, the neural network (via the one or more hardware processors 104) are configured to receive, at a first part of the neural network 204 (see FIG. 2), a current frame to generate one or more corresponding convolutional feature maps. Therefore until the last frame is receive, for each such frame the neural network generates one or more corresponding convolutional feature maps.

In an embodiment of the present disclosure, at step 506, a softmax layer 208 of the neural network generates (via (via the one or more hardware processors 104), a probability score and/or a class label for the generated one or more corresponding convolutional feature maps. In an embodiment of the present disclosure, there could be one or more class labels generated for the one or more corresponding convolutional feature maps, and each such class label may be having a probability score. The probability score is generated for each of the corresponding convolutional feature maps that are generated for each current frame. In an example embodiment, the softmax layer 208 utilizes a second part of the neural network (e.g., 206) that gets combined with the softmax layer 208 for generation of the probability score. In an embodiment, the softmax layer 208 is a classification layer, and it gives probability scores of input that how input is likely to be the desired output class.

In an embodiment of the present disclosure, at step 508, a cost function 210 of the neural network, generates, via the one or more hardware processors 104, a cost value based on the corresponding class label and the probability score. In other words, the cost function 210 accepts input from both the CNN block 202 and the softmax layer 208 and then it determines the cost value by diminishing all probability scores except the desired class. In other words, the cost function 210 is referred as or defined as a loss layer, and in this present disclosure, it keeps the probability score of desired class and diminishes the all other probability scores after the block 208. In an embodiment, the probability score is generated by the softmax layer 208 by utilizing a second part of the neural network (e.g., blocks 206, 208, etc.).

In an embodiment of the present disclosure, at step 510, one or more gradient maps are generated by the second part of the neural network block 206 via the one or more hardware processors 104. The one or more gradient maps are generated using the cost value (and corresponding associated class labels) and the generated one or more corresponding convolutional feature maps. FIG. The one or more gradient maps are fed as input to a target activation map generator 212, wherein at step 512, the target activation map generator 212 generates, via the one or more hardware processors 104, one or more target activation maps based on the generated one or more gradient maps and the generated one or more corresponding convolutional feature maps. In an embodiment of the present disclosure, at step 514, a tentative location (and/or tentative locations) of the target object of interest in the video frame is identified based on the one or more target activation maps. Target object of interest and a frame in which location is identified is fed as input to system 100 for identifying tentative location(s) based on the one or more target activation maps. In an embodiment of the present disclosure, the tentative location of the target object of interest in the video frame is identified by resampling, the generated one or more corresponding convolution feature maps into a size of the video frame, converting the generated one or more gradient maps to a single dimensional vector, generating one or more target activation maps based on the size of the video frame and the single dimensional vector based on which the tentative location of the target object of interest in the video frame is identified. The target activation map generator 212 comprises a resampling unit (or sampler) 302 that receives the generated one or more corresponding convolution feature maps (also referred as 'input map') resizes/reshapes the input map to the desired size. In the present disclosure, the generated one or more corresponding convolution feature maps is up-sampled to the size of the input frame. In an embodiment, the target activation map generator 212 comprises a pooling unit 304 that takes the one or more gradient maps as input and down-samples the one or more gradient maps using an average or max value in the window (e.g., down-sampled the gradient maps by an average of it). The output from each of the resampling unit 302 and the pooling unit 304 are fed to a multiplier 306 of the target activation map generator 212, wherein the multiplied is configured to use the output generated by both the resampling unit 302 and pooling unit 304 to generate the one or more target activation maps.

In an embodiment of the present disclosure, at step 516, a peak location estimator 214 identifies (or estimates) a position of the target object in the video frame based on the tentative location. In an embodiment of the present disclosure, the peak location estimator 214 extracts, using a pre-process and patch of interest (PoI) extractor 402, one or more patches from one or more neighborhoods of the tentative location of the generated one or more target activation maps, generates, by using a correlation filter 404, a correlation filter response for each frame at center of the target object of interest, and identifies, using a peak estimator 406, a peak value based on the correlation filter response generated for each frame. When there are multiple patches that are identified and extracted from the neighborhood of the tentative location of the target activation map, these multiple patches may be fed individually to the correlation filter 404 to result in its correlation response. True position can be predicted from the correlation responses which has a maximum peak (among multiple peaks being identified, if any). The one or more target activation maps may highlight different objects in the image, having higher values at the target object of interest. In order to locate find the exact (or precise) location, these locations having high activation values are fed to correlation filter(s). Sometimes there may be multiple places where the target activation maps have higher values, so the system 100 follow a local block based or threshold based approach to find the multiple peaks and their locations. The patch around these peak location are fed to correlation filter(s).

The peak location estimator 214 then estimates the (precise or accurate or near accurate) position of the target object based on the identified peak value in the correlation filter response for each frame. In an embodiment, the pre-process and patch of interest extractor 402 extracts region/patch (i.e., sub-image) from input map. In an embodiment of the present disclosure, when multiple peaks occur at different locations in the target activation maps, then the neural network recursively applies above steps at each peak and then predicts peak that is more relevant (a maximum peak among available and identified peaks) to identify/estimate the position of the target object of interest. In other words, after having the Target Activation Maps (TAMs), identified few positions which have maximum value in TAMs could be considered as tentative locations of the object of interest. At each tentative location, a patch may be extracted and fed to correlation filter. This patch (or patch of interest) is either convolution features or TAM. Each patch at tentative location provides correlation filter response and correlation filter response of a patch which has maximum peak value is selected which further provides the position of the target of interest.

It is to be understood by a person having ordinary skill in the art and by person skilled in the art that although the present disclosure describes position estimation of a target object of interest, it is possible to identify or estimate position of multiple target objects of interest as well. It is to be further noted that although comparison of proposed system and traditional systems and approaches, the system 100 is test with and without the target of interest and observed that the system 100 with the target of interest and frame performs well. Further, when there is a high/abrupt motion in the object(s), traditional systems/methods may tend to lose track of the object(s) (or target of interest) as their search area is dependent on the neighborhood of the detected location in the previous frame. But the proposed systems and methods locate the target object of interest even if there is a substantial change in the location of the object(s)/target within the frame. Further, the proposed systems and methods that include blocks 202, 204, 206 and 208 do not require updating of parameters (e.g., hyper parameters of CNN and components associated thereof) thus making the system 100 faster and efficient in terms of processing data (e.g., target object of interest, and complete frame) and enabling the system 100 to be suitable for lightweight applications.

On the other hand, the correlation filter 404 enables learning of parameters of the correlation filter 404 based on input in such a way that resultant output should have a maximum response at the position where the target exists in the input frame. In an embodiment of the present disclosure, the correlation filter 404 is trained based on the identified peak value and at least one of a corresponding patch (and/or multiple patches) or one or more features extracted from the corresponding patch (and/or multiple patches), and one or more parameters pertaining to the correlation filter 404 are updated accordingly. In an embodiment of the present disclosure, the one or more features that are extracted may comprise but are not limited to, invariant features, for example, SIFT (Scale Invariant Feature Transform), Histogram of oriented gradients (HOG) features, Hu-moment features, SURF (Speed Up Robust Features), edges, color, hue, saturation, etc. In an embodiment, the one or more parameters comprise weights values, and the like. If the input patch size is say, 100×100, then the weight values will be 100×100, in an example embodiment.

In an embodiment the neural network 202 and associated components blocks 204, 206, 208, 210), the target activation map generator 212 and associated components blocks 302, 304, and 306, and the peak location estimator 214 and associated components blocks 302, 304, and 306, may be either integrated with the system 100 or externally connected to the system 100 via one or more communication interfaces available to perform the methodologies described herein by the embodiments of the present disclosure. Alternatively, the neural network 202 and associated components blocks 204, 206, 208, 210), the target activation map generator 212 and associated components blocks 302, 304, and 306, and the peak location estimator 214 may form an integral part of the system 100, in one example embodiment.

With reference to FIG. 2, arrows depicting forward pass or arrows represented in solid line horizontally indicate that in the forward pass, inputs are processed (multiplication or summation) with corresponding weights (or parameters) and move forward to next block. Similarly, arrows depicting backward pass or arrows represented in dotted line horizontally indicate that in the backward pass the neural network derives the partial derivatives of the cost function with respect to block 202 via blocks 206 and 208. The CNN as implemented by way of example by the present disclosure, consists of multiple layers which have both convolutional layers and fully connected layers. During the training process, parameters of each layer is adjusted to fit the data. It is to be understood by a person having ordinary skill in the art and by person skilled in the art that although the present disclosure depicts implementation of the CNN for performing methodologies described herein, the present disclosure can employ any neural network to perform methodologies described herein as well, and such implementation of CNN as discussed above shall not be construed as limiting the scope of the present disclosure.

Figure 6A:
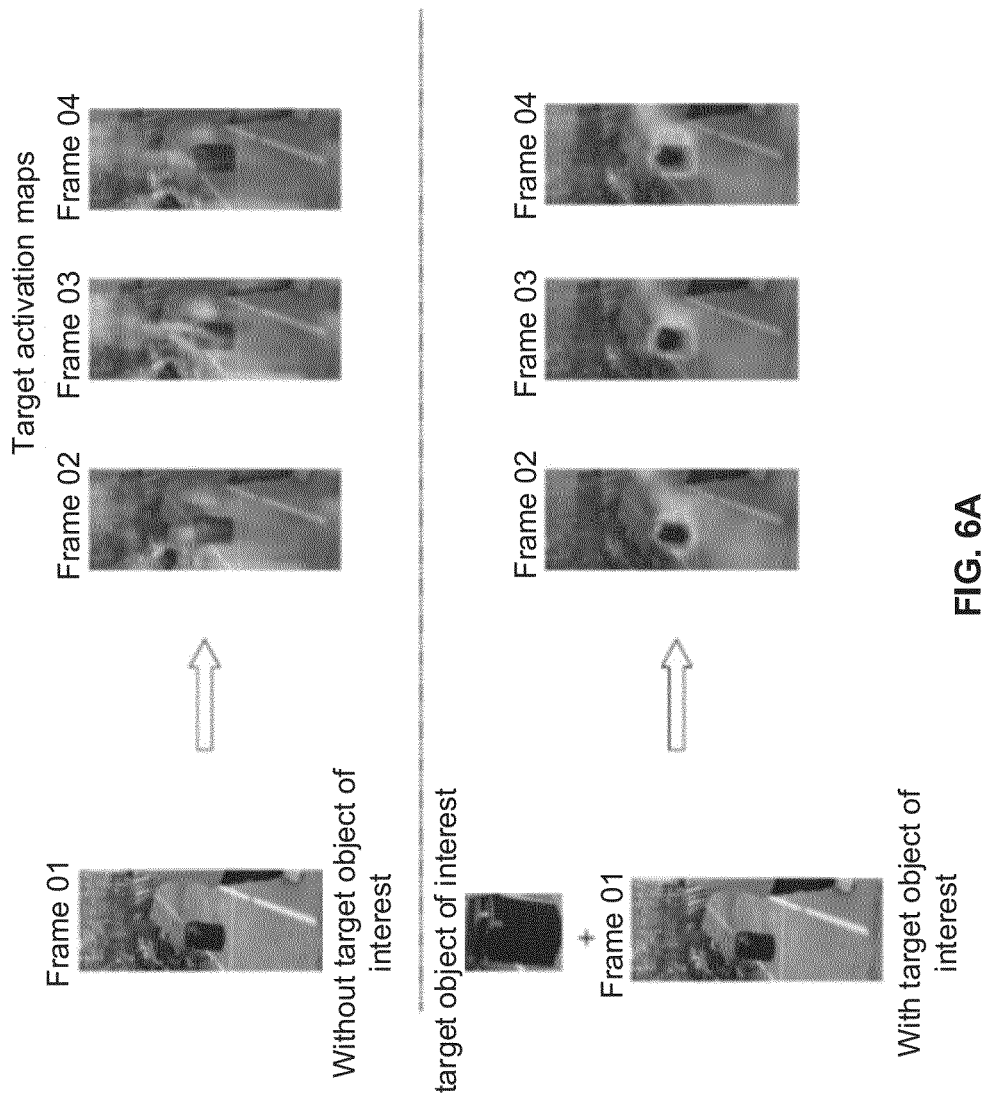
FIG. 6A depict a comparison of outputs generated for (i) only complete frame fed as input, and (ii) target object of interest and a frame, in which location is identified, fed as input in the system of FIG. 1 of the proposed present disclosure for position estimation of target object of interest in accordance with an embodiment of the present disclosure.
Figure 6B:
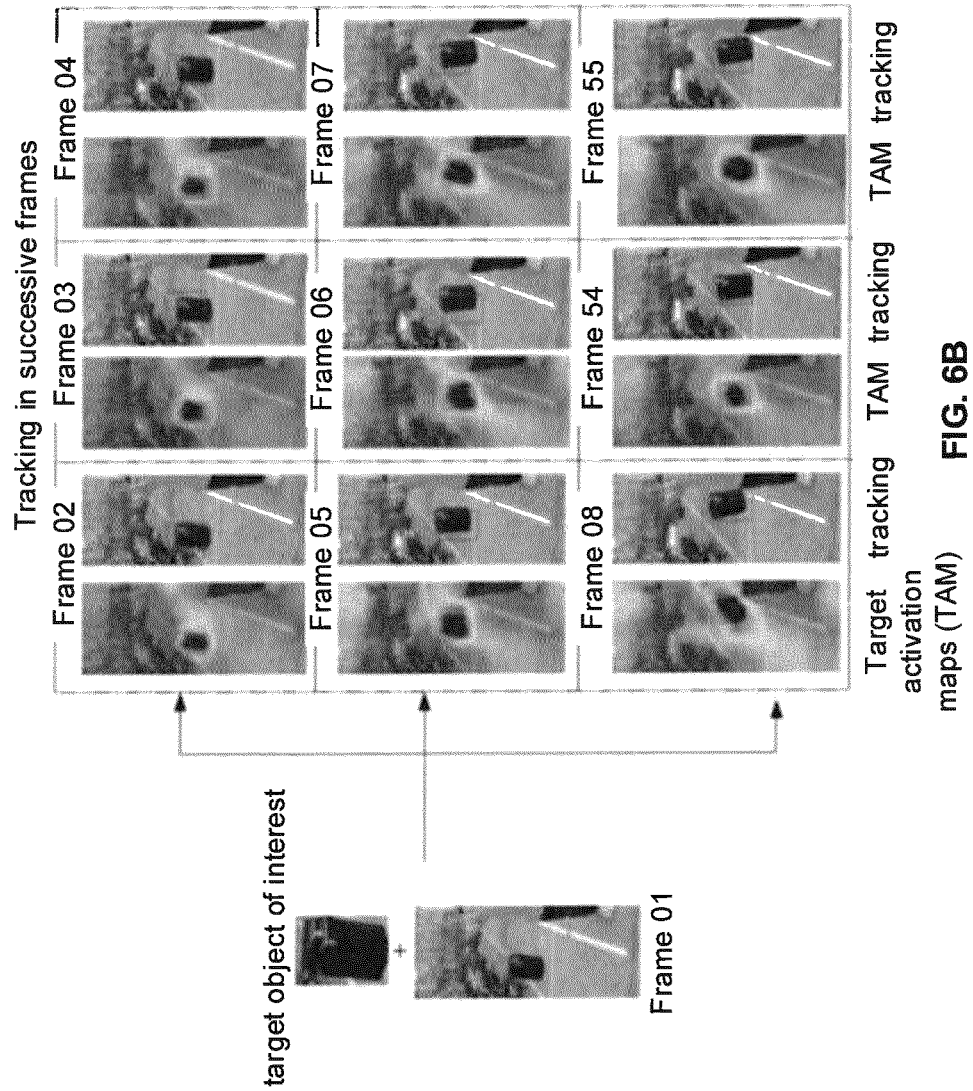
FIG. 6B depicts estimating position of target object of interest in successive frame when the target object of interest and full frame is provided as input to the system of FIG. 1 in accordance with an embodiment of the present disclosure FIG. 7 depict an output generated by the system of FIG. 1 using one or more components of FIGS. 2-3 in accordance with an embodiment of the present disclosure.

FIG. 6A, with reference to FIGS. 1 through 5, depict a comparison of outputs generated for only (i) complete frame fed as input, and (ii) target object of interest and a frame, in which location is to be identified, fed as input in the system 100 of the proposed present disclosure for position estimation of target object of interest in accordance with an embodiment of the present disclosure. As can be seen from FIG. 6A, the upper portion that depicts the output generated by one of traditional systems and methods for gradient map and target activation map for an input which is just an image only (or target object of interest), and the lower portion which depicts output generated by the system 100 of FIG. 1 and components of FIG. 2 through 4 of the present disclosure for gradient map and target activation map for input which includes target of interest and as well as a frame (e.g., a full video frame). It is evident from outputs depicted in FIG. 6A that embodiments and systems (including components) of the present disclosure provide better accuracy of position estimation of target object of interest when compared to systems and methods that only utilize a full (video) frame, which may be typically the case in few of the conventional approaches (e.g., traditional systems and methods). FIG. 6B, with reference to FIGS. 1 through 6A, depicts estimating position of target object of interest in successive frames when the target object of interest and full frame is provided as input to the system 100 of FIG. 1 in accordance with an embodiment of the present disclosure. As can be seen in FIG. 6B, the successive frames are shown wherein in each frame type (e.g., frame 08), on the left side is the target activation map, and on the right side is the tracking or position estimation of the target object of interest. Additionally, the target object of interest is identified in a previous frame (e.g., frame 01) and provided as an input to the system 100. As a current frame (e.g., say frame 02) is considered for processing, the system 100 receives patch of interest from a previous frame wherein the patch is identified from a correlation filter response (e.g., patch having a maximum filter response or maximum peak(s)). This reception of patch of interest from a previous frame to a current frame under consideration for processing enables the system 100 to efficiently and accurately track/estimate the position of the target object of interest in the entire frame (e.g., a full video frame). This process continues until a last frame is processed. In an embodiment of the present disclosure, when there is no change in the appearance of the target object (e.g., orientation/rotation of the target object) in the current frame and/or in the previous frame, in such scenarios, the patch of interest that is identified while processing the previous frame may not be required as an input during the processing of the current frame under consideration.

Figure 7:
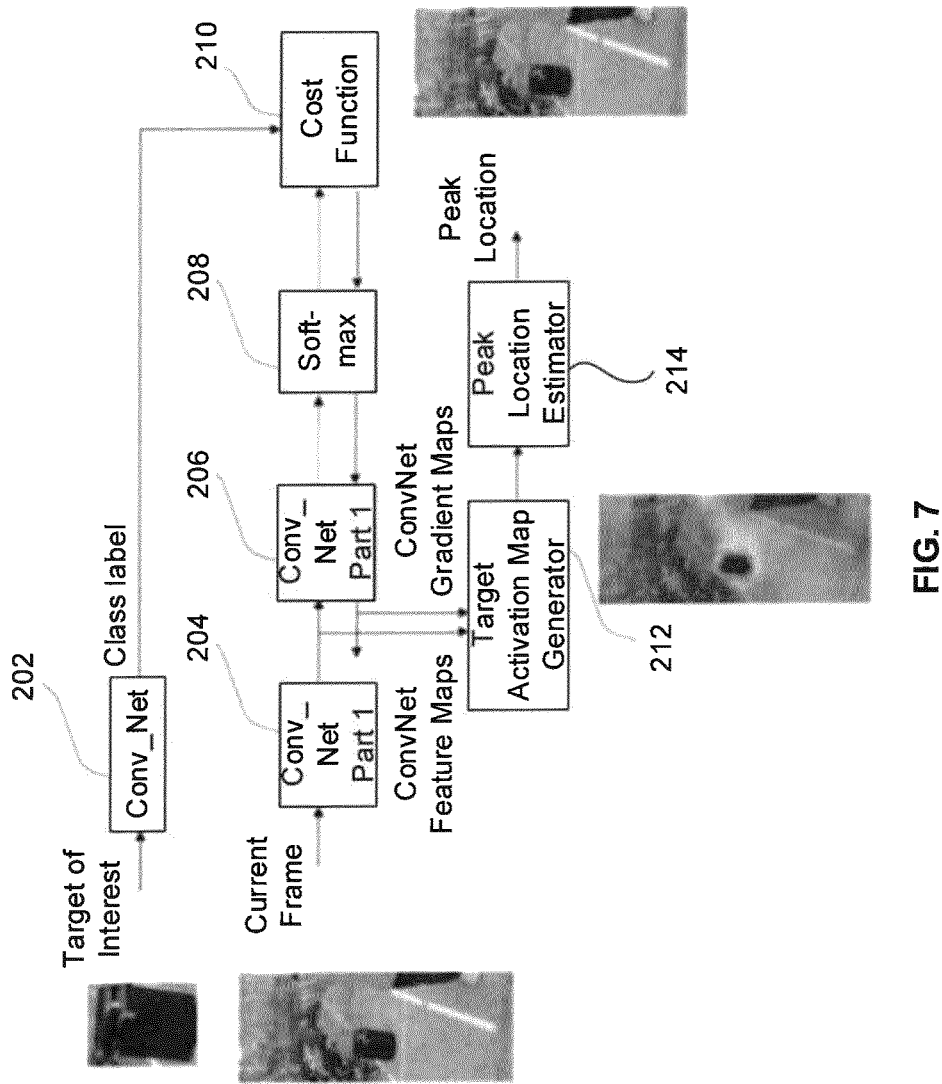

FIG. 7, with reference to FIGS. 1 through 6B, depict an output generated by the system 100 of FIG. 1 using one or more components of FIGS. 2-3 in accordance with an embodiment of the present disclosure. As can be seen from FIG. 7 that a full video frame (e.g., a first input) and a target object of interest patch (second input) is fed to the neural network of the system 100 to generate an output comprising position estimation of the target object of interest (e.g., in this case a person carrying a bag which is a target object of interest).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

receiving, at a neural network, a first input comprising a video frame, and a second input comprising a target object of interest in the video frame, wherein a corresponding class label is generated based on the second input;

receiving, at a first part of the neural network, a current frame to generate one or more corresponding convolutional feature maps;

generating, by a softmax layer of the neural network, a probability score for the generated one or more corresponding convolutional feature maps;

generating by a cost function, a cost value based on the generated corresponding class label and the corresponding probability score;

generating one or more gradient maps using the cost value and the generated one or more corresponding convolutional feature maps;

generating one or more target activation maps based on the generated one or more gradient maps and the generated one or more corresponding convolutional feature maps; and identifying a tentative location of the target object of interest in the video frame based on the one or more target activation maps, wherein the step of identifying the tentative location of the target object of interest in the video frame based on the one or more target activation maps comprises:

sampling, the generated one or more corresponding convolution feature maps into a size of the video frame;

converting the generated one or more gradient maps to a single dimensional vector;

generating the one or more target activation maps based on the size of the video frame and the single dimensional vector; and identifying the tentative location of the target object of interest in the video frame using the generated one or more target activation maps.

2. The processor implemented method of claim 1, further comprising identifying, by a peak location estimator, a position of the target object in the video frame based on the tentative location.

3. The processor implemented method of claim 2, wherein the step of identifying, by a peak estimator, a position of the target object comprises:

extracting one or more patches from one or more neighborhoods of the tentative location of the generated one or more target activation maps;

generating, by using a correlation filter, a correlation filter response for each frame at center of the target object of interest;

identifying a peak value based on the correlation filter response generated for each frame; and estimating the position of the target object based on the identified peak value in the correlation filter response for each frame.

4. The processor implemented method of claim 1, wherein the probability score is generated by the softmax layer by utilizing a second part of the neural network.

5. The processor implemented method of claim 3, further comprising training the correlation filter based on the identified peak value and at least one of a corresponding patch or one or more features extracted from the corresponding patch; and updating one or more parameters pertaining to the correlation filter.

6. A system comprising:

a memory storing instructions;

one or more communication interfaces; and one or more hardware processors coupled to the memory via the one or more communication interfaces, wherein the one or more hardware processors are configured by the instructions to:

receive, by a neural network, a first input comprising a video frame, and a second input comprising a target object of interest in the video frame, wherein a corresponding class label is generated based on the second input;

receive, at a first part of the neural network, a current frame to generate one or more corresponding convolutional feature maps;

generate, by using a softmax layer of the neural network, a probability score for the generated one or more corresponding convolutional feature maps;

generate by a cost function of the neural network, a cost value based on the generated corresponding class label and the corresponding probability score;

generate one or more gradient maps using the cost value and the generated one or more corresponding convolutional feature maps;

generate, by using a target activation map generator, one or more target activation maps based on the generated one or more gradient maps and the generated one or more corresponding convolutional feature maps; and identify a tentative location of the target object of interest in the video frame based on the one or more target activation maps, wherein the tentative location of the target object of interest in the video frame is identified based on the one or more target activation maps by:

sampling, by using a sampler, the generated one or more corresponding convolution feature maps into a size of the video frame and converting the generated one or more gradient maps to a single dimensional vector;

generating, by the target activation map generator, the one or more target activation maps based on the size of the video frame and the single dimensional vector; and identifying the tentative location of the target object of interest in the video frame using the generated one or more target activation maps.

7. The system of claim 6, further comprising a peak location estimator that identifies a position of the target object in the video frame based on the tentative location.

8. The system of claim 7, wherein the position of the target object is identified by:

extracting, by using a pre-process and patch of interest extractor, one or more patches from one or more neighborhoods of the tentative location of the generated one or more target activation maps;

generating, by using a correlation filter, a correlation filter response for each frame at center of the target object of interest;

identifying, by using a peak estimator, a peak value based on the correlation filter response generated for each frame; and estimating the position of the target object based on the identified peak value in the correlation filter response for each frame.

9. The system of claim 6, wherein the probability score is generated by the softmax layer by utilizing a second part of the neural network.

10. The system of claim 8, wherein the one or more hardware processors are configured by the instructions to: train the correlation filter based on the identified peak value and at least one of a corresponding or one or more features extracted from the corresponding patch; and update one or more parameters pertaining to the correlation filter.

11. One or more non-transitory machine readable information storage mediums comprising one or more instructions which when executed by one or more hardware processors cause:

receiving, at a neural network, a first input comprising a video frame, and a second input comprising a target object of interest in the video frame, wherein a corresponding class label is generated based on the second input;

receiving, at a first part of the neural network, a current frame to generate one or more corresponding convolutional feature maps;

generating, by a softmax layer of the neural network, a probability score for the generated one or more corresponding convolutional feature maps;

generating by a cost function, a cost value based on the generated corresponding class label and the corresponding probability score;

generating one or more gradient maps using the cost value and the generated one or more corresponding convolutional feature maps;

generating one or more target activation maps based on the generated one or more gradient maps and the generated one or more corresponding convolutional feature maps; and identifying a tentative location of the target object of interest in the video frame based on the one or more target activation maps, wherein the step of identifying the tentative location of the target object of interest in the video frame based on the one or more target activation maps comprises:
    sampling, the generated one or more corresponding convolution feature maps into a size of the video frame;
    converting the generated one or more gradient maps to a single dimensional vector;
    generating the one or more target activation maps based on the size of the video frame and the single dimensional vector; and
    identifying the tentative location of the target object of interest in the video frame using the generated one or more target activation maps.

12. The one or more non-transitory machine readable information storage mediums of claim 11, wherein the instructions which when executed by the one or more hardware processors further cause identifying, by a peak location estimator, a position of the target object in the video frame based on the tentative location.

13. The one or more non-transitory machine readable information storage mediums of claim 12, wherein the step of identifying, by a peak estimator, a position of the target object comprises:
    extracting one or more patches from one or more neighborhoods of the tentative location of the generated one or more target activation maps;
    generating, by using a correlation filter, a correlation filter response for each frame at center of the target object of interest;
    identifying a peak value based on the correlation filter response generated for each frame; and
    estimating the position of the target object based on the identified peak value in the correlation filter response for each frame.

14. The one or more non-transitory machine readable information storage mediums of claim 11, wherein the probability score is generated by the softmax layer by utilizing a second part of the neural network.

15. The one or more non-transitory machine readable information storage mediums of claim 13, wherein the instructions which when executed by the one or more hardware processors further cause training the correlation filter based on the identified peak value and at least one of a corresponding patch or one or more features extracted from the corresponding patch; and updating one or more parameters pertaining to the correlation filter.

\* \* \* \* \*